United States Patent [19]

Presley et al.

[11] 4,182,689

[45] Jan. 8, 1980

[54] TREATMENT OF OIL-IN-WATER EMULSIONS

[75] Inventors: C. Travis Presley; Rebecca J. Harrison, both of Littleton, Colo.

[73] Assignee: Marathon Oil Company, Findlay, Ohio

[21] Appl. No.: 894,318

[22] Filed: Apr. 7, 1978

Related U.S. Application Data

[63] Continuation-in-part of Ser. No. 820,987, Aug. 1, 1977, abandoned.

[51] Int. Cl.$^2$ ............................................. B01D 17/04
[52] U.S. Cl. .................................... 252/330; 210/43
[58] Field of Search ............................. 252/330, 329; 210/DIG. 27, 43

[56] References Cited

U.S. PATENT DOCUMENTS

| | | | |
|---|---|---|---|
| 2,740,804 | 4/1956 | Glazier | 252/330 X |
| 3,741,908 | 6/1973 | Dalley | 252/330 |
| 3,931,005 | 1/1976 | Gasser | 252/329 X |
| 4,014,801 | 3/1977 | Fullinwider et al. | 252/330 X |
| 4,026,794 | 5/1974 | Mauceri | 252/329 X |

FOREIGN PATENT DOCUMENTS 1642824  8/1972  Fed. Rep. of Germany ........... 252/330

*Primary Examiner*—Benjamin R. Padgett
*Assistant Examiner*—E. Suzanne Parr
*Attorney, Agent, or Firm*—Joseph C. Herring; Jack L. Hummel

[57] ABSTRACT

Petroleum is separated from an "oil-in-water" emulsion containing water-soluble polymer prior to refining by adding amphoteric metal cations to the emulsion to form a flocculate and then treating the resulting flocculate with a strong base to recover the oil and metal.

11 Claims, No Drawings

TREATMENT OF OIL-IN-WATER EMULSIONS

CROSS REFERENCE TO RELATED APPLICATIONS

This is a continuation-in-part of our now abandoned patent application, Ser. No. 820,987, filed Aug. 1, 1977.

1. Field of the Invention

The present invention relates to processes of recovering (refining) hydrocarbons by separating or removing oil from "oil-in-water" emulsions with treating agents. More specifically, it relates to techniques and compositions for resolving emulsions of "oil-in-water" by utilizing inorganic treating agents.

2. Description of the Prior Art

Crude oil, as produced from oil wells, is usually accompanied by water. Frequently a portion of the crude oil, as produced, is emulsified with the accompanying water. Where the emulsions are of the "water-in-oil" type, they are easily treated to break the emulsions and recover the oil. Methods of treating "water-in-oil" emulsions include electrical precipitation or the addition of small quantities of surfactants. In some cases the produced crude oil is emulsified in water in the form of an "oil-in-water" emulsion, in which the water is the continuous phase and the oil is the dispersed phase. Such emulsions are capable of infinite dilution with water without breaking, and in contrast with the "water-in-oil" type, they do not separate from the water nor float on the water; but, on the contrary, readily mix with the water. Demulsifying agents ordinarily used to break up "water-in-oil" emulsions may not be effective for treating "oil-in-water" emulsions.

In the prior art, U.S. Pat. No. 2,318,714 teaches that simple "oil-in-water" emulsions may be separated by the addition to the emulsion of a small amount of aluminum chloride. However, that patent does not deal with the separation of "oil-in-water" emulsions which also include a water-soluble polymer.

Other prior art which has been noted includes: U.S. Pat. No. 1,252,433 which teaches the use of anhydrous aluminum sulfate to dehydrate asphalt; and U.S. Pat. No. 1,724,222 which teaches the use of sodium hydroxide with an aqueous emulsion of tar in a combined heat and pressure process.

Modern secondary and tertiary techniques of oil recovery are being utilized to recover additional amounts of petroleum after the initial flow has ceased. In a number of these techniques, water containing anionic surfactants and water-soluble polymer are pumped into a depleted formation. Alternately, solutions of dispersions of surfactant in water may be injected. The anionic surfactant in the solution provides lower interfacial tension between the water solution and the oil in the ground. This allows the oil to be more efficiently mobilized. The mobilized oil is displaced by water containing water-soluble polymer.

The recovered crude oil and water may include an "oil-in-water" emulsion. When this polymer-bearing "oil-in-water" emulsion is treated by the addition of amphoteric metal cations, preferably aluminum, in accordance with the teaching of U.S. Pat. No. 2,318,714, a portion of the fluid dispersion is converted into a viscous heterogeneous flocculate containing oil and water. It is believed that the mass is formed by precipitation of the water-soluble polymer in the produced fluids. The oil present in the mixture is difficult to separate using normal treating processes.

SUMMARY OF THE INVENTION

According to the present invention, oil is separated from emulsions of "oil-in-water" which emulsions include a water-soluble polymer. The process consists of the steps of first treating the "oil-in-water" polymer containing emulsion with a cation of an amphoteric metal, preferably aluminum, and then treating the resulting flocculate with a strong base to recover the oil and metal.

The invention will be apparent from the more particular description of preferred embodiments of the invention.

DESCRIPTION OF THE PREFERRED EMBODIMENTS

The process of the present invention can be practiced under a broad range of demulsification conditions including substantial variations in the amount and source of cation and variations in the pH of the caustic solution. It can be applied successfully to "oil-in-water" emulsions containing up to 75%, by weight, oil. However, the preferred and expected emulsions to be treated normally contain from about 1000 parts per million to up to about 10%, by weight, oil. Such emulsions, when containing water-soluble polymers from tertiary recovery processes, would normally include from about 20 to no more than about 2000 parts per million polymer, although the presence of greater amounts of polymer would fall within the invention. Where the "oil-in-water" emulsion is the product of tertiary recovery, the solution would be expected to include anionic surfactants in concentrations of from about 20 up to as much as about 20,000 parts per million.

The source and amount of cation utilized in the practice of this invention can vary widely. Concentrations of cation of as little as 10 parts per million parts of emulsion will work in the practice of the present invention. Greater concentrations of cation will also work in the practice of the present invention, but may result in waste. Useful cations include any soluble salts of a metal which forms an amphoteric hydroxide, such as zinc chloride, aluminum chloride, aluminum acetate, aluminum nitrate, stannous citrate, hydrated chromic chloride, or the double sodium or ammonium salts of aluminum, commonly referred to as "alum". Salts such as aluminum acetate can be utilized, but normally require slightly higher concentrations due to their tendency to form an acetate complex. The aluminum cation is preferred. The amphoteric metals are discussed in the McGraw-Hill Encyclopedia of Science and Technology, Vol. 1, p. 342.

The source of the caustic solution may be any strong base, such as for example, sodium hydroxide or potassium hydroxide. But the caustic solution must normally have a pH of a minimum of about 13, and preferably about 13.2, or greater. In the preferred embodiments a pH range for the caustic solution of about 13.2 to about 13.5 is preferred. It should be remembered that while a specific pH range has been indicated, any caustic solution having a pH which will dissolve the flocculate mass by the addition of water-soluble, amphoteric metal cations is intended to come within the teaching of the present invention.

EXAMPLES

EXAMPLE I

About 1 liter of an "oil-in-water" emulsion containing about 3%, by weight, petroleum, about 500 parts per million petroleum sulfonate and about 500 parts per million of a partially hydrolyzed polyacrylamide water treated with about 3.2 ml. of a solution of 10% aluminum sulfate. This provided a reaction mixture containing 50 parts per million of aluminum cation. The emulsion immediately formed a water solution and a floc, and within a matter of seconds the floc formed a viscous mass. The viscous mass contained substantially all of the oil from the emulsion. However, the oil could not be readily extracted from the mass. After the water was removed, the mass could literally be rolled up and removed from the container. It is therefore apparent that utilizing the addition of aluminum cations, as taught by the prior art, does not by itself provide a satisfactory technique for separating oil from a polymer-containing "oil-in-water" mixture.

Example II

An "oil-in-water" emulsion, similar to that utilized in Example I, was added to a solution of sodium hydroxide having a pH of about 13.2. The emulsion began to coagulate, but then dispersed and no other visible reaction was noted. Due to the large volume of the emulsion, it is not practical to raise the pH of the entire emulsion to greater than 13. It is therefore apparent that utilization of a strong base, by itself, is not a practical method for the demulsification of an "oil-in-water" emulsion including a water-soluble polymer.

Example III

About 1 liter of an "oil-in-water" emulsion similar to those utilized in Examples I and II was utilized for this experiment. To the emulsion was added 3.2 ml. of a solution of 10% aluminum sulfate. This produced a reaction mixture containing 50 parts per million of aluminum cation. A floc was formed and skimmed from the top of the container. The floc was then introduced into a solution containing sodium hydroxide at a pH of about 13.5. The floc separated into an oil phase and an aqueous phase and the oil was readily removed.

Example IV

To an oil-in-water emulsion similar to that of Example III is added alum, $AlNH_4(SO_4)_2$, in an amount sufficient to provide 44.6 ppm aluminum ion to form a floc which is skimmed from the top of the liquid. The floc is introduced into an aqueous solution of sodium hydroxide to free the oil and redissolve the metal.

Example V

A concentrated aqueous solution of $ZnCl_2$ is added to an emulsion containing crude oil sulfonate (0.5 ml.), Henry lease crude oil (30 ml.) and 500 ppm polyacrylamide in water (96.5 ml.) to a concentration of 600 ppm $Zn^{++}$. The resulting sludge is removed. Approximately 15 ml. of the sludge was treated with a 25% solution of sodium hydroxide to free the oil from the sludge.

Modifications obvious to one skilled in the art are included within the scope of the invention as defined in the specification and claims appended hereto.

While this invention may be practiced as a batch process, it is readily modifiable for utilization as a continuous treatment process. For example, the stream from a tertiary recovery process may be continuously fed into a gravity separation tank and the oil which is not emulsified may be continuously removed from the top of the container. The phase containing "oil-in-water" emulsion may be removed from the bottom of the container and directed to another container. A cation source may be introduced along the line through which the "oil-in-water" emulsion is piped. Then, for example, when the resulting mixture reaches a second container, an automatic skimmer may continuously remove the floc from the surface of the mixture and feed that floc to a tank containing a concentrated high pH caustic solution. When the floc is fed into the caustic solution, the floc dissolves, the oil floats to the surface, and the by-products remain in solution in the tank. Of course, the oil may then be removed continuously from the top of the tank containing the caustic solution. With this latter type of operation, much larger quantities of emulsion can be efficiently and conveniently processed.

Although it is not understood with certainty what the mechanism of the present invention is, it is theorized that the cations initiate flocculation accompanied by precipitation of the water-soluble polymer. It is then theorized that the hydroxyl anions in the base form a soluble complex with the metal ions in the floc removing the cation from the precipitate and redissolving the polymer in the caustic solution.

While a preferred embodiment of the present invention has been shown, many modifications of the process are possible. The aluminum cation may be added to the emulsion in solid form, as a small amount of concentrated solution, or as a continuous stream of dilute solution. The solutions of aluminum cation which may be used may be prepared in any convenient manner. While aluminum is the flocculating agent of choice, other materials, such as the zinc cation, can be utilized to flocculate the emulsion for dissolution in a caustic solution.

In the examples, the water-soluble polymer was a polyacrylamide and was more specifically Pusher 700, a product of The Dow Chemical Company which is 30% hydrolyzed, having a molecular weight in the range of 1 million to 10 million. Other polyacrylamides and other water-soluble polymers which precipitate upon the addition of cation and which redissolve when treated with a high pH solution are capable of treatment by the practice of the present invention. The present invention is not limited to the treatment of emulsions containing polyacrylamide., Reference is made throughout this specification and in the following claims to "oil", "crude oil", "petroleum" and "hydrocarbons". As used herein, these terms are intended to be used interchangeably.

What is claimed is:

1. The process of separating crude oil from "oil-in-water" emulsions containing water-soluble polymer, which process includes the steps of: adding to the emulsion amphoteric metal cations selected from the group consisting of aluminum, chromium, tin and zinc in water-soluble form and treating the resulting flocculate with a strong base.

2. The method of claim 1 wherein the "oil-in-water" emulsion contains up to about 75%, by weight, oil and up to 2000 parts per million, or more, by weight, of water-soluble polymer.

3. The process of claim 1 wherein the "oil-in-water" emulsion contains from about 1000 parts per million to about 10%, by weight, oil and about 20 to about 500 parts per million, by weight, of water-soluble polymer.

4. The method of claim 1 wherein the pH of the strong base is at least about 13 or greater.

5. The method of claim 1 wherein the pH of the strong base is in the range of about 13.2 to about 13.5.

6. The method of claim 1 wherein the "oil-in-water" emulsion includes from about 20 to about 20,000 parts per million, by weight, of an anionic surfactant.

7. The process of claim 1 wherein the amphoteric metal cation is aluminum.

8. The process for the separation of crude petroleum from "oil-in-water" emulsions containing about 3%, by weight, oil and including about 500 parts per million, by weight, of a water-soluble polymer which includes the steps of: adding aluminum cation at a concentration of about 50 parts per million, by weight, of the emulsion and then treating the resulting flocculate with a strong base having a pH of about 13.5.

9. The method of claim 8 wherein the water-soluble polymer is polyacrylamide.

10. The method of claim 8 wherein the source of aluminum cation is $Al_2(SO_4)_3$.

11. The method of claim 8 wherein the strong base is sodium hydroxide.

* * * * *